United States Patent
Klingauf et al.

(10) Patent No.: US 10,970,223 B2
(45) Date of Patent: Apr. 6, 2021

(54) CACHE DROP FEATURE TO INCREASE MEMORY BANDWIDTH AND SAVE POWER

(71) Applicant: Apple Inc., Cupertino, CA (US)

(72) Inventors: Wolfgang H. Klingauf, San Jose, CA (US); Kenneth C. Dyke, Los Altos, CA (US); Karthik Ramani, San Jose, CA (US); Winnie W. Yeung, San Jose, CA (US); Anthony P. DeLaurier, Los Altos, CA (US); Luc R. Semeria, Palo Alto, CA (US); David A. Gotwalt, Winter Springs, FL (US); Srinivasa Rangan Sridharan, San Jose, CA (US); Muditha Kanchana, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/410,828

(22) Filed: May 13, 2019

(65) Prior Publication Data
US 2019/0266102 A1 Aug. 29, 2019

Related U.S. Application Data

(63) Continuation of application No. 15/610,008, filed on May 31, 2017, now Pat. No. 10,289,565.

(51) Int. Cl.
*G06F 12/08* (2016.01)
*G06F 12/0891* (2016.01)
(Continued)

(52) U.S. Cl.
CPC ...... *G06F 12/0891* (2013.01); *G06F 12/0804* (2013.01); *G06F 12/0808* (2013.01);
(Continued)

(58) Field of Classification Search
CPC .. G06F 12/12; G06F 12/0891; G06F 12/0804; G06F 12/126; G06F 12/123;
(Continued)

(56) References Cited

U.S. PATENT DOCUMENTS

| 5,915,262 A | 6/1999 | Bridgers et al. |
| 6,681,296 B2 | 1/2004 | Liao et al. |

(Continued)

OTHER PUBLICATIONS

Cloudflare Support, "How to Purge Cache Using Cache-Tags [Enterprise only]", Jul. 16, 2018, 4 pages, https://web.archive.org/web/20180823173745/https://support.cloudflare.com/hc/en-us/articles/206596608-How-to-Purge-Cache-Using-Cache-Tags-Enterprise-only-. [Retrieved May 28, 2020].

(Continued)

*Primary Examiner* — Hua J Song
(74) *Attorney, Agent, or Firm* — Kowert Hood Munyon Rankin and Goetzel PC; Rory D. Rankin

(57) ABSTRACT

Systems, apparatuses, and methods for efficiently allocating data in a cache are described. In various embodiments, a processor decodes an indication in a software application identifying a temporal data set. The data set is flagged with a data set identifier (DSID) indicating temporal data to drop after consumption. When the data set is allocated in a cache, the data set is stored with a non-replaceable attribute to prevent a cache replacement policy from evicting the data set before it is dropped. A drop command with an indication of the DSID of the data set is later issued after the data set is read (consumed). A copy of the data set is not written back to the lower-level memory although the data set is removed from the cache. An interrupt is generated to notify firmware or other software of the completion of the drop command.

20 Claims, 9 Drawing Sheets

(51) Int. Cl.
  *G06F 12/0804* (2016.01)
  *G06F 12/0808* (2016.01)
  *G06F 12/0815* (2016.01)
  *G06F 12/123* (2016.01)
  *G06F 12/0895* (2016.01)
  *G06F 12/126* (2016.01)
  *G06F 12/12* (2016.01)

(52) U.S. Cl.
  CPC ...... *G06F 12/0815* (2013.01); *G06F 12/0895* (2013.01); *G06F 12/12* (2013.01); *G06F 12/123* (2013.01); *G06F 12/126* (2013.01); *G06F 2212/604* (2013.01); *G06F 2212/608* (2013.01); *G06F 2212/621* (2013.01)

(58) Field of Classification Search
  CPC ............. G06F 12/0815; G06F 12/0808; G06F 2212/604; G06F 12/0895; G06F 2212/608; G06F 2212/621
  USPC .......................................................... 711/133
  See application file for complete search history.

(56) References Cited

U.S. PATENT DOCUMENTS

| | | |
|---|---|---|
| 8,237,723 B2 | 8/2012 | Swift et al. |
| 8,810,591 B2 | 8/2014 | Stauffer et al. |
| 8,928,680 B1 | 1/2015 | Sanketi et al. |
| 9,158,685 B2 | 10/2015 | Biswas |
| 9,244,843 B1* | 1/2016 | Michels ............... G06F 12/0817 |
| 9,329,900 B2 | 5/2016 | Naravez et al. |
| 9,489,306 B1 | 11/2016 | Murugesan |
| 9,824,026 B2 | 11/2017 | Dong et al. |
| 10,289,565 B2 | 5/2019 | Klingauf et al. |
| 10,672,099 B2 | 6/2020 | Imbrogno et al. |
| 2004/0162961 A1 | 8/2004 | Lyon |
| 2007/0067575 A1 | 3/2007 | Morris et al. |
| 2011/0153949 A1* | 6/2011 | Olszewski ............ G06F 12/128 711/133 |
| 2012/0272011 A1 | 10/2012 | Carrie et al. |
| 2013/0229848 A1 | 9/2013 | Vogelsang |
| 2015/0081980 A1* | 3/2015 | Walker ................ G06F 11/0721 711/135 |
| 2015/0348225 A1 | 12/2015 | Schreyer et al. |
| 2016/0247248 A1 | 8/2016 | Ha et al. |
| 2016/0259729 A1 | 9/2016 | Persson |
| 2017/0357585 A1* | 12/2017 | Moyer ................ G06F 12/0862 |

OTHER PUBLICATIONS

Non-Final Office Action in U.S. Appl. No. 15/996,312, dated Sep. 25, 2019, 15 pages.

* cited by examiner

*Data Set Identifier Mapping Table*
*300*

| Virtual Data Set Identifier | Physical Data Set Identifier | Current Number of Cache Lines | Quota Number of Cache Lines | Drop in Progress |
|---|---|---|---|---|
| 58 (N/A) | 0 | 0 | 42,000 | No (N/A) |
| 80 | 1 | 28,843 | 50,000 | Yes |
| 81 | 2 | 15,823 | 50,000 | Yes |
| 82 | 3 | 32,401 | 50,000 | Yes |
| ⋮ | | | | |
| 121 | 28 | 8,993 | 33,000 | No |
| 125 | 29 | 20,982 | 45,000 | No |
| 254 (N/A) | 30 | 0 | 38,000 | No (N/A) |
| 255 (N/A) | 31 | 0 | 38,000 | No (N/A) |

CACHE DROP FEATURE TO INCREASE MEMORY BANDWIDTH AND SAVE POWER

CROSS REFERENCE TO RELATED APPLICATIONS

This application is a continuation of U.S. patent application Ser. No. 15/610,008, entitled "CACHE DROP FEATURE TO INCREASE MEMORY BANDWIDTH AND SAVE POWER", filed May 31, 2017, the entirety of which is incorporated herein by reference.

BACKGROUND

Technical Field

Embodiments described herein relate to the field of integrated circuits and, more particularly, to efficiently allocating data in a cache.

Description of the Related Art

Lower-level memory in a computing system provides relatively inexpensive and relatively large data storage capacity, especially compared to on-chip caches. However, off-chip dynamic random access memory (DRAM) and hard drives used as lower-level memory have appreciable access times when data access requests are serviced. Therefore, system performance is affected. One approach to improving performance involves using one or more caches in a hierarchical memory subsystem to reduce data access latencies.

While using caches can improve performance, various issues reduce the effectiveness of cache performance. For example, conflict, or collision, misses occur within a set-associative or a direct-mapped cache when too many blocks map to a same set. The misses cause one or more blocks to be discarded within that set. As a consequence, the average memory latency for a given source in the system may be degraded due to the misses. The cache misses cause accesses to lower-level memory to retrieve the requested data in addition to evicting data to create storage for the retrieved data.

Many software applications generate "temporal" data which are used for a short period of time and sometimes only once. For example, modern game rendering engines use a number of render-to-texture passes which generate data used for a short period of time while an entire frame is being rendered. Once certain images have been produced and subsequently consumed, the data corresponding to these certain images is accessed no more. Yet, the data remains stored in the cache causing cache misses and traffic with lower-level memory until selected by a cache replacement policy. At this time, the data, which is accessed no more, may be written to lower-level memory which causes additional traffic. Further, as system performance decreases power consumption increases as a result of the cache misses and increased traffic to the lower-level memory.

In view of the above, methods and mechanisms for efficiently allocating data in a cache are desired.

SUMMARY

Systems and methods for efficiently allocating data in a cache are contemplated. In various embodiments, a computing system uses processor connected to a memory cache which is used as a last-level cache in a hierarchical memory subsystem before accessing a lower-level memory. When the processor executes instructions of a software application, the processor generates memory access requests for fetching instructions and application data as well as for generating new result data. The memory access requests are sent to the memory cache and when a cache miss occurs, the memory access request is sent from the memory cache to the lower-level memory. When data is selected for replacement in the memory cache, the data is written back to the lower-level memory. When generating new data, the processor generates temporal data used for a short period of time for generating result data.

In various embodiments, the cache controller for the memory cache receives an indication that a data set is temporal and it is unnecessary to maintain storage beyond a limited number of access requests targeting the data set. For example, a first data set is fetched from lower-level memory into the memory cache. The first data set is read once to be used to generate a different second data set. The first data set is not used again. In another example, the produced second data set is read once to generate a different third data set, and the second data set is not accessed again.

In an embodiment, the software developer marks each of the first data set and the second data set in the software application as temporal data to later drop after consumption. In one embodiment, the software developer uses a particular function call or application programming interface (API) to perform the marking. Each of the first data set and the second data set carry a marking or flag throughout the computing system which indicates they are temporal data which is later dropped after consumption. In some embodiments, the indication or flag is a particular data set identifier (DSID). For example, in one embodiment, a range of DSIDs is used to identify data sets which are to be dropped after being consumed. In other embodiments, a source generates data sets for later dropping. Examples of the source are a graphics processing unit (GPU), another video graphics processor, a camera, a display controller, a media controller, and any other type of processing unit capable of identifying a last time that the temporal data is read (consumed).

When each of the first data set and the second data set are allocated in the cache array of the memory cache at respective points in time, in some embodiments each is stored with a "non-replaceable attribute" that prevents a cache replacement policy, such as the least recently used (LRU) replacement policy, from evicting the data before being dropped. In one embodiment, a drop command with an indication of the DSID of the first data set is later issued after the first data set is read (consumed). In some embodiments, a drop command may include multiple DSIDs. In another embodiment, the source that generated the data inserts a hint in a read request targeting the data. The hint indicates the requested targeted data is to be dropped after being read. In some embodiments, the source inserts the hint in the read request when the temporal data is being read (consumed) for the last time. In some embodiments, the inserted hint includes one or more DSIDs.

In various embodiments, the drop of the first data set is initiated either by the drop command or by the hint inserted in an access request by the source. The cache controller executes the drop of the first data set by preventing a copy of the first data set from being written to lower-level memory. As such, the first data set is simply removed from the cache array of the memory cache. For example, each cache line corresponding to the first data set may be invalidated. In one embodiment, an interrupt indicating the first data set is dropped is generated to notify firmware, or other software, of the completion of the drop command for the first data set. In another embodiment, a particular configuration or status register is updated to indicate the completion of the drop for the first data set. Similar steps are performed for a drop for the second data set if a separate drop command is issued or a separate hint is inserted in access requests for the second data set where the hint indicates a drop. If the DSID of the second data set is included in the same drop command for the first data set, then the indication of completing the drop command is not generated until the steps are done for each of the first data set and the second data set.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

Figure 1:
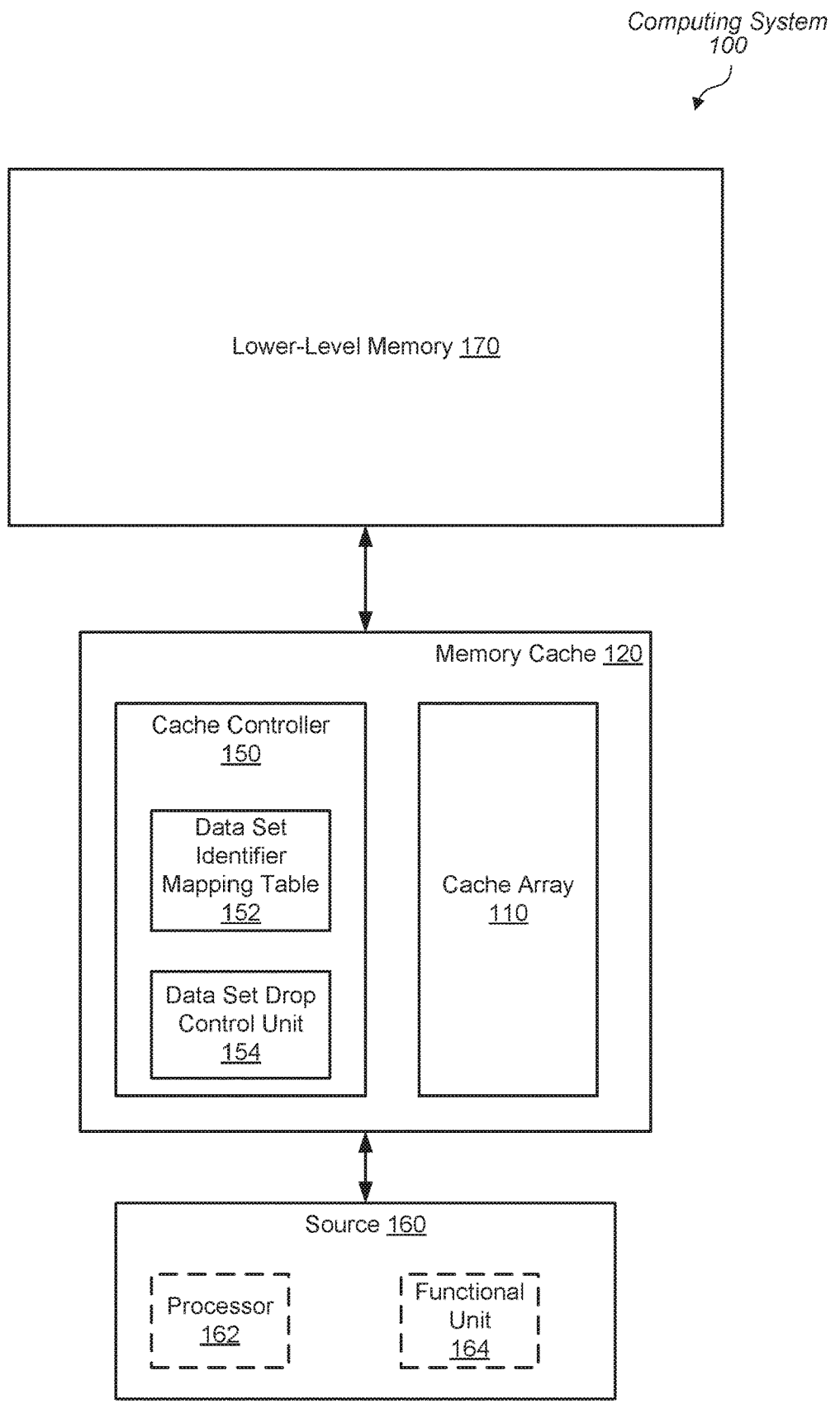
FIG. 1 is a block diagram of one embodiment of a computing system.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Referring to FIG. 1, a block diagram illustrating one embodiment of a computing system 100 is shown. In the illustrated embodiment, a source 160 is connected to a memory cache 120 which stores one or more of instructions of a software application, application data fetched along with the instructions, generated temporal data and generated result data. The memory cache 120 is connected to a lower-level memory 170 which stores similar types of data as the memory cache 120. In various embodiments, the memory cache 120 and the lower-level memory 170 are part of a hierarchical cache memory subsystem. Although not shown, in some embodiments, the source 160 includes one more levels of caches.

In various embodiments, the source 160 includes one or more of a variety of types of processors and functional units used for processing instructions of software applications and corresponding data. For example, in an embodiment, the processor 162 within the source 160 is one of a variety of processors such as a general-purpose central processing units (CPU), or a highly parallel data processing unit using a single instruction multiple data (SIMD) microarchitecture such as a graphics processing unit (GPU), a digital signal processor (DSP) or a field programmable gate array (FPGA). Although a single processor 162 is shown, in various embodiments, the source 160 includes multiple processors. In one embodiment, the source 160 uses a combination of processor types in a heterogeneous architecture. Each of the processors uses one or more processor cores and supports the processing of one or more threads.

In an embodiment, the functional unit 164 within the source 160 is one of multiple types of integrated circuits (functional units) on a single semiconductor die, each integrated circuit providing a separate functionality. Examples of the functional units are a camera functional unit, a video encoder, a video decoder, a media controller, and so on. In some embodiments, the processor 162 and the functional unit 164 are individual dies on an integrated circuit (IC), such as a system-on-a-chip (SoC). In other embodiments, they are individual dies within a package, such as a multichip module (MCM). In yet other embodiments, they are individual dies or chips on a printed circuit board. In various embodiments, each of the processor 162 and the functional unit 164 is capable of accessing the shared memory cache 120.

In various embodiments, the lower-level memory 170 is off-chip or external memory. Examples of the lower-level memory 170 are dynamic RAM (DRAM), synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. In some embodiments, the lower-level memory 170 uses one or more memory modules to which the memory devices are mounted, such as single inline memory modules (SIMMs), dual inline memory modules (DIMMs), etc. In other embodiments, the lower-level memory 170 uses one or more memory devices that are mounted on a system on a chip (SoC) in a chip-on-chip or package-on-package implementation utilizing three dimensional integrated circuits (3D ICs).

In various embodiments, the latencies and the power consumption for accesses of the lower-level memory 170 are at least an order of magnitude greater than the latencies and the power consumption for accesses of the memory cache 120. Therefore, removing unnecessary accesses of the lower-level memory 170 decreases memory traffic and reduces power consumption. Therefore, the data set drop control unit 154 determines which data sets are temporal data sets and removes these data sets from the memory cache 120 when they are consumed as they are accessed no more. In addition, the control unit 154 prevents the cache lines corresponding to the temporal data sets from being written to the lower-level memory 170.

As used herein, a temporal data is a data set used for a relatively short period of time and then it is accessed no more. In one example, the temporal data set is fetched from the lower-level memory 170 into the memory cache 120. In another example, the temporal data is temporal result data produced from other data stored in the memory cache 120 and the temporal result data is written into the memory cache 120. Following, the temporal result data is consumed such as having a copy sent to a requestor during a read access request. Once consumed, the temporal result data is used no more, and therefore, the temporal result data is a candidate to be dropped.

Rather than continue using storage resources of the memory cache 120, the temporal data is removed from the memory cache 120 by being invalidated followed by not being written back to the lower-level memory 170 such as DRAM. The data set drop control unit 154 within the cache controller 150 performs these steps. Therefore, memory traffic is reduced, power consumption is decreased and an amount of storage resources in the memory cache 120 increases for other data, which improves system performance.

In one embodiment, the software developer marks data sets in a software application known to be temporal data. This type of data set is to be dropped later after consumption. In one embodiment, the software developer uses a particular function call or application programming interface (API) to perform the marking. The software application is fetched into the processor 162 and executed. Each temporal data set carries a marking or flag throughout the computing system 100 which indicates it is temporal data which is later dropped after consumption. In some embodiments, the indication or flag is a particular data set identifier (DSID). For example, in an embodiment, a range of DSIDs is used for identifying temporal data sets which are to be later dropped after being consumed.

When the temporal data set is allocated in the memory cache 120, in some embodiments, the control unit 154 within the cache controller 150 stores a non-replaceable attribute in cache lines corresponding to the temporal data set to prevent a cache replacement policy from evicting the temporal data set before it is dropped. In other embodiments, particular DSIDs stored in the cache lines are used to indicate the non-replaceable attribute without actually storing the attribute in the cache lines. In one embodiment, a drop command with an indication of the DSID of the temporal data set is later issued after the temporal data set is read (consumed) for the last time. In other embodiments, the source that generated the temporal data inserts a hint in one or more read requests for the temporal data when the temporal data is being consumed for the last time. The inserted hint indicates the temporal data is to be dropped. In some embodiments, the data set drop control unit 154 uses the DSID mapping table 152 for mapping received DSIDs to smaller physical DSIDs to reduce storage in the memory cache 120.

Figure 2:
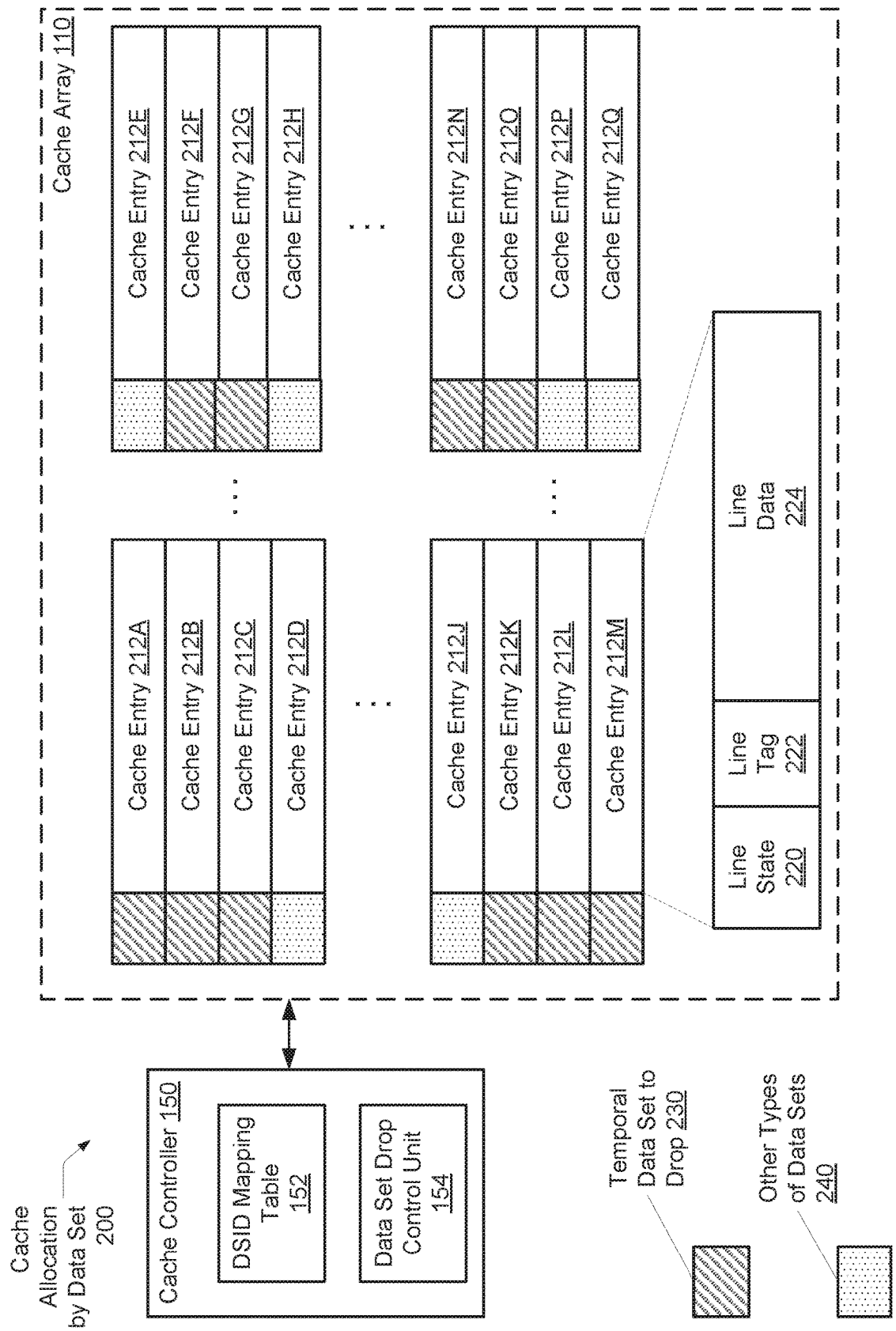
FIG. 2 is a block diagram of one embodiment of cache allocation by data set.

Turning now to FIG. 2, a block diagram illustrating one embodiment of cache allocation 200 by data sets is shown. Control logic and components described earlier are numbered identically although in some embodiments there are some differences. As shown, the cache controller 150 is connected to the cache array 110 with cache entries 212A-212Q. Each one of the cache entries 212A-212Q stores a line state 220, a line tag 222 and line data 224. In various embodiments, a data set property is part of the line state 220. In some cases, the data set property for a given one of the cache entries 212A-212Q indicates the data is part of a temporal data set 230 to drop. As described earlier, a temporal data set is a data set used for a short period of time and then it is accessed no more. In one example, the temporal data set is either fetched or produced and then followed by being consumed such as having a copy sent to a requestor during a read access request. Once consumed, the temporal data is used no more and therefore is a candidate to be dropped. In these cases, the line data 224 is consumed shortly after it is produced, and it is accessed no more.

Rather than continue using storage resources of the cache array 110, line data 224 of a temporal data set is removed by being invalidated followed by not being written back to the next lower-level memory such as DRAM. The data set drop control unit 154 within the cache controller 150 performs these steps. In other cases, the data set property for a given one of the cache entries 212A-212Q is one of multiple other types of data sets 240 which are not dropped and are written back to the next lower-level memory when removed from the cache array 110.

The cache controller 150 and the cache array 110 use one of a variety of methods of addressing for locating data such as a direct mapped method, a set-associative method or a fully-associative method. Although the cache array 110 is shown with cache entries 212A-212Q in a table-like manner, it is for illustrative purposes as one of a variety of cache organizations is used for storage of the cache entries 212A-212Q. When a set-associative cache organization is used, a given cache set is chosen by the block index of an address of a memory access request. The line tag 222 in each of the cache entries 212A-212Q is used to determine which of the multiple cache lines are being accessed within the chosen one of the cache sets. In addition, an offset in the address is used to indicate a specific byte or word within the targeted cache line. In some embodiments, the line tag 222 is stored in a tag array separate from the data array of the cache 110.

The line data 224 of each of the cache entries 212A-212M stores one or more cache lines. As used herein, a "cache line" is a set of bytes stored in contiguous memory locations, which are treated as a unit for coherency purposes. As used herein, the terms "cache block", "block", "cache line", and "line" are interchangeable. In some embodiments, a cache line is the unit of allocation and deallocation in the cache. The number of bytes in a cache line and also a cache entry is varied according to design choice, and is of any size. As an example, 32 byte and 64 byte cache lines are often used.

As used herein, the term "allocate" refers to storing a cache fill line fetched from a next lower level of the cache hierarchy into one of the cache entries 212A-212Q subsequent a cache miss to the cache array 110. If there are no available ways within the corresponding set of a set-associative cache organization, then a cache replacement policy, such as a Least Recently Used (LRU) algorithm, determines which way within the set is to have its data evicted and replaced by the cache fill line data. The evicted cache line is written back to the lower-level memory.

In various embodiments, a cache line identified as being a cache line within a temporal data set is allocated in one of the cache entries 212A-212Q with a non-replaceable attribute in the line state 220 to prevent a cache replacement policy, such as the least recently used (LRU) replacement policy, from evicting the temporal cache line before it is dropped. In other embodiments, a data set identifier indicating the temporal data set to drop 230 which is stored in the cache line is used to indicate the non-replaceable attribute without actually storing this attribute in the cache lines. In addition to the non-replaceable attribute, in various embodiments, the line state 220 in each of the cache entries 212A-212Q stores one or more of a valid bit, a thread identifier (ID); a node ownership ID; a clean/dirty state, Least Recently Used (LRU) eviction information, an indication of the data set property designating whether the cache line is part of a temporal data set to drop 230 or another type of data set 240 to not drop, an indication designating a cache coherency state such as modified, exclusive, owned, shared, and invalid; and so forth.

As described earlier, in some cases, the data set property is a temporal data set 230 to drop. In various embodiments, a processor or a functional unit fetches or produces the temporal data and stores the temporal data in the cache array 110. In some embodiments, video game applications use multiple render-to-texture passes with temporal data. The data is fetched as application data or the data is produced, and then the data is consumed shortly thereafter, and accessed no more. In such cases, the source of the temporal data is a graphics processing unit (GPU).

Media workloads for image scaling, rotating, and color space conversion use stages with data which is also temporal. Therefore, the source of the temporal data is a media controller such as a particular functional unit in a system on a chip (SOC). Cameras, video encoders and video decoders are yet further examples of functional units producing temporal data sets to be stored in the cache array 110. General-purpose central processing units (CPUs) also are capable of generating temporal data sets to be stored in the cache array 110.

In an embodiment, the data set property is a data set identifier (DSID) reserved for data to be dropped. In some embodiments, the data set drop control unit 154 uses the DSID mapping table 152 for mapping received DSIDs to smaller physical DSIDs to reduce storage in the cache array 110. For example, the control unit 154 inspects data received for allocation, determines the received DSID designates the received data as being part of a temporal data set, and maps the received DSID. In some embodiments, the received DSID is an 8-bit DSID capable of identifying 256 different data sets with a particular range designating temporal data sets. In one example, 10 of the 256 data sets belong to the other types of data sets 230 while 246 of the 256 data sets belong to the temporal data sets 230 to drop. The control unit 154 uses the DSID mapping table 152 to map the received 8-bit virtual DSID to a smaller physical DSID such as a 5-bit physical DSID. Therefore, the control unit 154 manages 32 different physical data sets simultaneously. When data sets are dropped, the control unit 154 reuses the physical DSIDs.

Although particular values are described above for the sizes of the DSIDs and the ranges, any other values are possible and contemplated for use.

As described earlier, in some embodiments, after a particular data set is read from corresponding entries of the cache entries 212A-212Q, a drop command is received by the control unit 154 for removing this data set with the property of the temporal data set to drop 230. In other embodiments, a source that generated the temporal data inserts a hint in read requests for the temporal data when the temporal data is being consumed for the last time. The inserted hint indicates the temporal data is to be dropped. Examples of such sources include a graphics processing unit (GPU), another video graphics processor, a camera, a display controller, a media controller, and any other type of processing unit capable of identifying a last time that the data set with the property of the temporal data set to drop 230 is read (consumed). The control unit 154 recognizes the DSID designated in the drop command is within a range of DSIDs indicating data sets with the property of the temporal data set to drop 230. The control unit 154 maps the received DSID to a smaller physical DSID using the DSID mapping table 152.

In an embodiment, the control unit 154 searches the cache entries 212A-212Q. The search is referred to as a "walk" as the control unit 154 uses control logic distributed across the different sets in the cache array 110, and the distributed control logic searches each way within a given set. When a cache entry is found with the physical DSID stored in the line state 220, the data stored in the line data 224 is removed from the cache array 110 by invalidating the cache entry. However, the data stored in the line data 224 is not written back to lower-level memory. In one embodiment, the control unit 154 generates an interrupt indicating the particular data set is dropped. The interrupt notifies firmware or other software of the completion of the drop for the particular data set whether the drop was initiated by a drop command or the drop was initiated by a hint inserted in a read request by the source. In another embodiment, the control unit 154 updates a particular configuration or status register to indicate the completion of the drop for the particular data set.

Figure 3:
FIG. 3 is a block diagram of one embodiment of a mapping table.

Turning now to FIG. 3, a generalized block diagram of one embodiment of a data set identifier mapping table 300 is shown. As shown, the table 300 uses fields 310-350 for maintaining mappings and characteristics of the mappings between received virtual data set identifiers and physical data set identifiers stored in the memory cache. In other embodiments, a larger number or a smaller number of fields is used in the table 300 and a different ordering of the fields is used. In the illustrated embodiment, field 310 stores a received virtual data set identifier and field 320 stores the corresponding physical data set identifier. As described earlier, in some embodiments, the received virtual data set identifier (V-DSID) is an 8-bit DSID capable of identifying 256 different data sets.

In an embodiment, a subset of the 256 data sets are reserved for data sets that do not include temporal data to drop. For example, the subset uses one data set for typical-use data which utilizes the LRU cache replacement policy. The subset also uses a data set for storing parameters of a processor (e.g., GPU), another data set for storing memory management unit (MMU) parameters and page tables, yet another data set for storing compressed metadata, and so on. In an embodiment, these multiple data sets within the subset of the 256 data sets total up to 10 data sets. The V-DSIDs for these 10 data sets are not stored within the table 300.

The V-DSIDs of the other remaining 246 data sets for temporal data which is later dropped are available for storage and mapping in the table 300. The control unit in the cache controller determines whether a received V-DSID is within the range of V-DSIDs available for mapping. In one embodiment, the control unit within the cache controller uses the mapping table 300 to map the received 8-bit V-DSID to a smaller physical DSID (P-DSID) such as a 5-bit P-DSID. Therefore, the control unit manages 32 different physical data sets simultaneously. Although particular values are described above for the sizes of the DSIDs and the ranges, any other values are possible and contemplated for use.

The field 330 stores the current amount of data using a particular mapping between the V-DSIDs and the P-DSIDs. In the illustrated embodiment, the amount of data is measured as a number of cache lines. In other embodiments, a quota group number, a capacity amount or other indication is used. When data is allocated in the cache which corresponds to the V-DSIDs indicating temporal data to later drop, the control unit in the cache controller increments the count in the associated row in field 330 by the number of cache lines allocated.

When data sets are dropped, the count in the associated row in field 330 is decremented by the number of cache lines invalidated. When the count reaches zero, the entire data set is dropped and the control unit in the cache controller reuses the P-DSID stored in field 320 of the associated row. As shown, the first entry in the mapping table 300 has the value 58 stored in field 310 for the V-DSID. However, the count in field 330 is zero. Therefore, a search of the mapping table 300 for the V-DSID of 58 results in a miss. In such an embodiment, a non-zero count in field 330 indicates a valid entry and a count of zero indicates an invalid entry. For the invalid entries, certain fields have an indication of not applicable (N/A) as the stored data no longer has any meaning. In other embodiments, a separate valid bit is stored in the mapping table 300 to indicate whether a stored mapping is valid.

In an embodiment, a limit of the amount of data stored in the cache for a given V-DSID is used and it is a programmable value. In some embodiments, a single quota is used for all valid V-DSIDs able to be stored in the mapping table 300. In other embodiments, a finer granularity is used. Similar to values stored in field 330, the quota (limit) of the amount of data for a given data set (V-DSID) stored in the cache is measured as a number of cache lines and stored in field 340. In other embodiments, a quota group number, a capacity amount or other indication is used. For embodiments where a coarse granularity is used for setting the programmable limit, the one or more quotas are stored in a separate configuration register rather than in the mapping table 300. In some embodiments, when the quota is reached, the control unit in the cache controller generates an interrupt to notify firmware. Field 350 in the mapping table 300 indicates whether a drop is in progress for the particular mapping. In some embodiments, a drop may be in progress due to an earlier issued drop command. In other embodiments, the drop is in progress due to an earlier access request that included a hint inserted by a source to drop the requested data.

Figure 4:
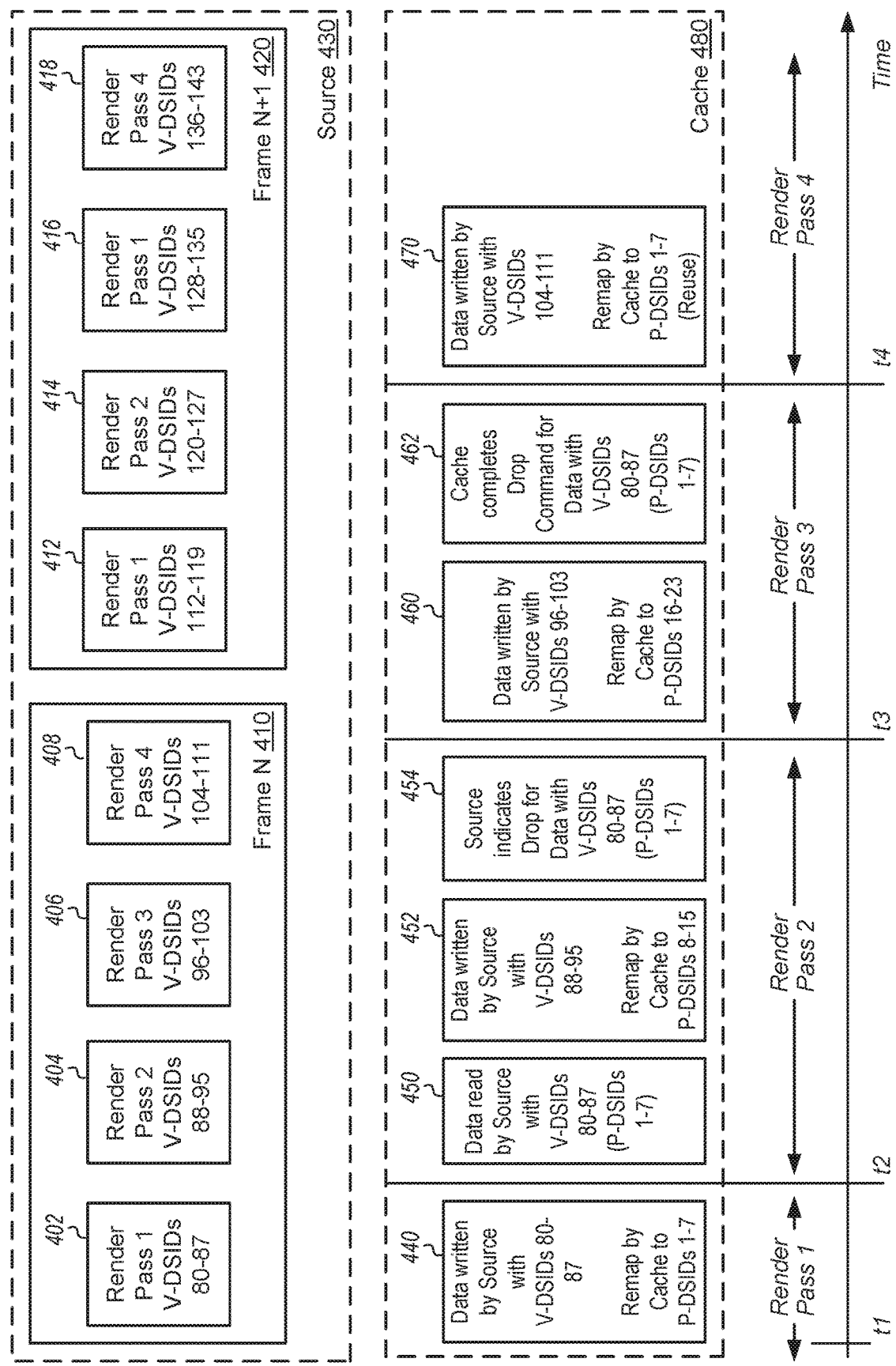
FIG. 4 is a block diagram of one embodiment of processing data sets.

Referring to FIG. 4, a generalized block diagram of one embodiment of processing data sets for a computing system is shown. As shown, source 430 has Frame N 410 and Frame N+1 420 to process. The cache 480 is used as a temporal buffer to store temporal data during the processing of the Frame N 410 and Frame N+1 420. In various embodiments, the source 430 generates temporal data sets for later dropping. In some embodiments, the source 430 is a graphics processing unit (GPU). In other embodiments, the source 430 is another video graphics processor. In yet other embodiments, the source 430 is a camera, a display controller, a media controller or any other type of processing unit capable of identifying a last time that temporal data is read (consumed). Each of the Frame N 410 and Frame N+1 420 uses corresponding commands and application data to be processed by the commands.

Virtual data set identifiers (V-DSIDs) are assigned to data sets within the Frame N 410 and Frame N+1 420. As shown, the control unit in the cache 480 assigns the V-DSIDs 80-87 to eight data sets within the data set group 402 in Frame N 410. Similarly, the eight data sets in the data set group 404 are assigned with the V-DSIDs 88-95, the eight data sets in the data set group 406 are assigned with the V-DSIDs 96-103, and eight data sets in the data set group 408 are assigned with the V-DSIDs 104-111. The eight data sets in each of the data set groups 412, 414, 416 and 418 in the Frame N+1 420 are assigned corresponding ones of the V-DSIDs 112-143.

In embodiments where the source 430 is a GPU, the GPU driver generates the commands to use for processing the data sets and assigns the V-DSIDs to the data sets significantly ahead of the source 430 processing the data sets. Therefore, the GPU driver has a relatively large number of V-DSIDs to use compared to the number of physical DSIDs (P-DSIDs) supported by the cache 480. As described earlier, in one embodiment, the GPU driver uses 246 available V-DSIDs, whereas the cache 480 supports 32 P-DSIDs. In the illustrated embodiment, the source 430 is performing a render operation and each render pass produces eight output textures. Four render passes are used for each of Frame N 410 and Frame N+1 420. The GPU driver assigns the thirty-two V-DSIDs 80-111 before the source 430 processes the data sets 402-408 of Frame N 410.

As previously described, the cache 480 is used as a temporal buffer. For example, a 1080 pixel image buffer with 4 bytes per pixel uses 8 megabytes of data storage. Compression techniques providing an average compression rate of one-to-two reduces the data storage to 4 megabytes. With the cache 480 having a size of 16 megabytes or more, it is possible to place four compressed image buffers, each with 4 megabytes of data storage, into the cache 480. In a significantly high percentage of the time, software applications generate image surfaces transferring data from one agent to another. Once the transfer is complete, the data is not accessed again. Using the cache 480 as a temporal buffer for buffering this type of temporal image data, rather than using lower-level memory such as DRAM, greatly reduces power consumption and memory bandwidth.

As shown in the illustrated embodiment, during render pass 1 between time t1 and t2, in time span 440, the cache 480 is written with the eight data sets assigned the V-DSIDs 80-87. The cache controller maps the V-DSIDs 80-87 to P-DSIDs 1-7. It is noted the time spans 440-470 are shown in sequential, non-overlapped order for ease of illustration. In other embodiments, some steps performed within the time spans 440-470 occur concurrently. In addition, clock cycles are not shown for ease of illustration. During render pass 2 between time t2 and t3, in time span 450, the eight data sets with the remapped P-DSIDs 1-7 are read (consumed). In addition, in time span 452, the cache 480 is written with the eight data sets assigned the V-DSIDs 88-95. The cache controller maps the V-DSIDs 88-95 to P-DSIDs 8-15. Further, in time span 454, the source 430 indicates a drop is to occur for eight data sets assigned the V-DSIDs 80-87. In some embodiments, the source 430 issues a drop command during the time span 454 under the control of the GPU driver. The drop command targets the eight data sets with the remapped P-DSIDs 1-7. In other embodiments, the source 430 inserts a hint in read requests sent during the earlier time span 450 where the hint indicates the eight data sets assigned the V-DSIDs 80-87 are to be dropped (e.g., on a last read of the data).

During render pass 3 between time t3 and t4, in time span 460, the cache 480 is written with the eight data sets assigned the V-DSIDs 96-103. The cache controller maps the V-DSIDs 96-103 to P-DSIDs 16-23. In time span 462, the cache completes processing the drop targeting the eight data sets with the remapped P-DSIDs 1-7. As described earlier, in some embodiments, the drop was initiated by a drop command. In other embodiments, the drop was initiated by a hint inserted in a read request by the source. When the cache controller removed the eight data sets with the remapped P-DSIDs 1-7 from the cache 480, the corresponding cache lines were invalidated without being written back to lower-level memory.

In some embodiments, an interrupt is generated by the cache controller to notify the GPU driver of the completion of the drop. In another embodiment, the cache controller updates a particular configuration register to indicate completion of the drop. During render pass 4 past time t4, in time span 470, the cache 480 is written with the eight data sets assigned the V-DSIDs 104-111. The cache controller maps the V-DSIDs completed. Therefore, the cache controller is able to reuse the P-DSIDs 1-7.

Figure 5:
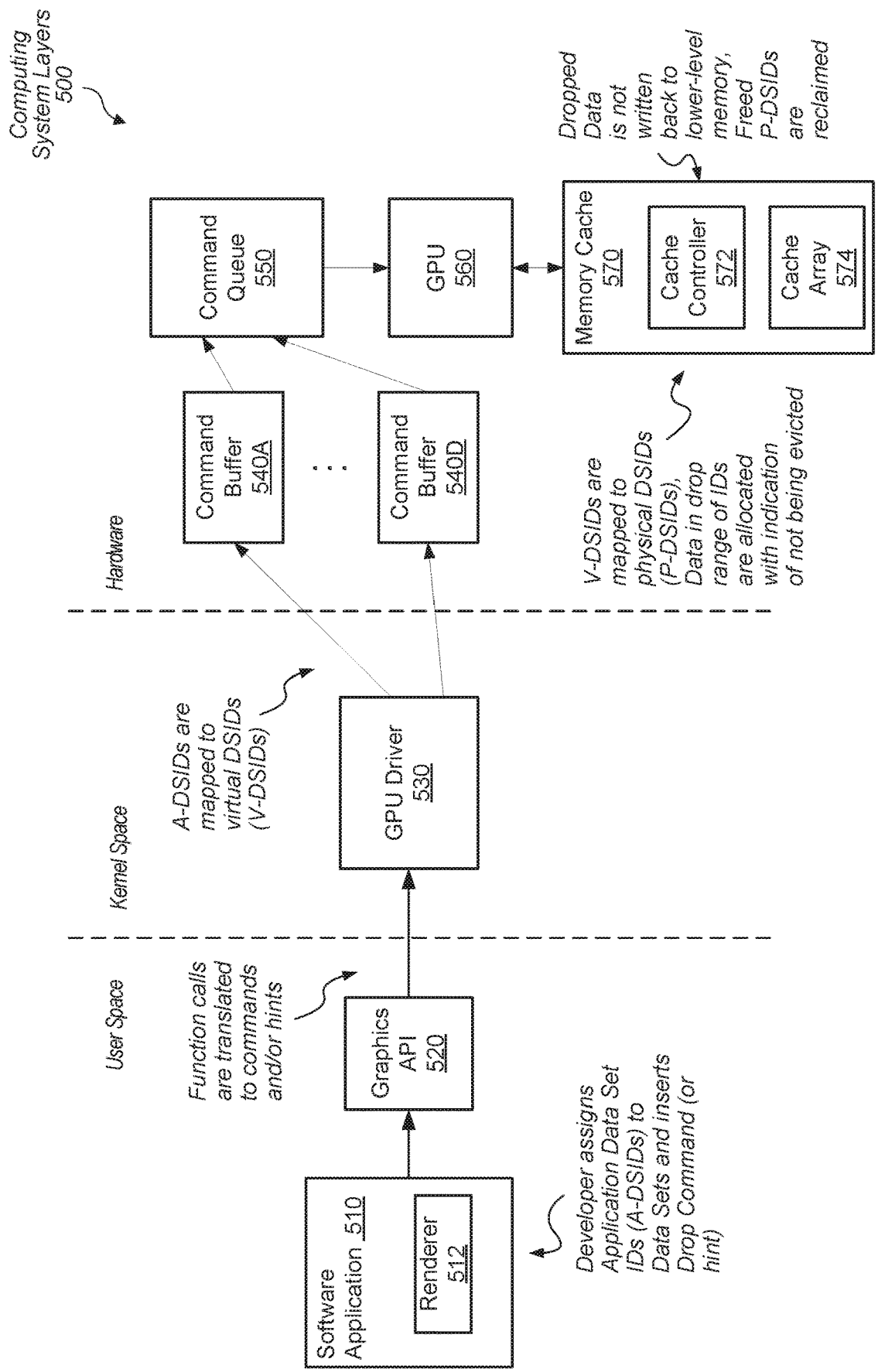
FIG. 5 is a block diagram of another embodiment of computing system layering model.

Turning now to FIG. 5, one embodiment of a computing system layering model 500 for a computing system is shown. As shown, model 500 uses a collection of user space components, kernel space components and hardware. A layered driver model, such as model 500, is one manner to process the software application 510. In this model, each driver is responsible for processing a part of a request. Such a layered driver model allows functionality to be dynamically added to a driver stack. It also allows each driver to specialize in a particular type of function and decouples it from having to know about other drivers.

In various embodiments, the software application 510 is a computer program written by a developer in one of a variety of high level programming languages such as C, C++, FORTRAN, and Java and so on. In some embodiments, the software application 510 uses a renderer 512 for processing video graphics data. For example, in some embodiments, the software application 510 uses a video modern game rendering engine 512 which performs a number of render-to-texture passes which generate data that is used for a short period of time over the course of an entire frame being rendered. In various embodiments, the software application 510 begins being processed on a general-purpose central processing unit (CPU) and later translated commands and corresponding data sets are sent to the graphics processing unit (GPU) 560.

In various embodiments, the GPU 560 generates temporal data sets during the processing of the software application 510. Examples of the temporal data sets are prim blocks and tile linked lists used by the renderer 512 and which are able to be dropped from the memory cache 570 after consumption. In addition, when processing a frame, between render passes, the GPU 560 provides static textures to the memory cache 570, which are fetched from lower-level memory and are able to be dropped after consumption. Similarly, shadow maps and depth, norm and color surface attributes are able to be dropped from the memory cache 570 after consumption. Between frames, the final output frame buffer is able to be dropped from the memory cache 570 after it has been consumed by another agent such as a display controller.

The software developer schedules workloads in combination with the runtime system by utilizing graphic libraries with their own application programming interfaces (APIs) 520 in the software application. One example of the APIs is Metal used for running applications on GPUs from Apple, Inc. Other examples of the APIs are OpenCL (Open Computing Language), OpenGL (Open Graphics Library) and OpenGL for Embedded Systems (OpenGL ES) used for running applications on GPUs from AMD, Inc. Further, DirectX is a platform for running programs on GPUs in systems using one of a variety of Microsoft operating systems. Yet another example of the APIs is CUDA for running applications on GPUs from NVidia Corp. The selected graphics library translates function calls in the software application 510 to commands particular to a piece of hardware, such as the GPU 560. The translated commands are sent to the GPU driver 530.

In various embodiments, the software developer assigns an application data set identifier (A-DSID) to particular data sets at points in the software application 510 where surfaces are generated. These particular data sets are part of certain images which are produced, subsequently consumed, and accessed no more. In addition, the software developer inserts a drop command in the software application 510 immediately after consumption of the particular data set. The drop command is used to remove the particular data from the cache after the particular data is consumed for the last time without writing the particular data to the lower-level memory such as DRAM.

In some embodiments, an indication of the drop command is inserted in the software application 510 by the developer and the graphics library. The insertion occurs through the graphics API 520 which translates the indication to the drop command. In other embodiments, the graphics API 520 provides a hint which allows the GPU driver 530 to send a drop command to the memory cache 570 after temporal data has been consumed.

In various embodiments, requests corresponding to translated commands are sent from the GPU driver 530 to the GPU 560. The translated command carries the V-DSID. In various embodiments, the communication protocol used for transferring traffic allows a hint to be carried with messages such as the translated command. In an embodiment, a hint, such as a binary encoding, indicates the drop command. The drop command (or hint) sent from the GPU driver 530 includes the one or more V-DSIDs of the temporal data sets to drop. The developer writing the software application 510 determines which resources are going to be dropped. In an embodiment, an API of the graphics API 520 provides a "begin" and "end" pair of API calls which constrain the time period when the contents of the texture is to be preserved. Accordingly, the GPU driver 530 captures all write operations to the GPU virtual address range into a DSDID assigned by the kernel driver (e.g., GPU driver 530).

The GPU driver 530 receives the translated commands and organizes them into groups to send to the command buffers 540A-540D along with corresponding data sets. The command groups are a set of commands to be sent and processed atomically. In some embodiments, the GPU driver 530 assigns state information for a command group. In an embodiment, the GPU driver 530 also translates the A-DSIDs to V-DSIDs by selecting identifiers from a range of V-DSIDs used for temporal data sets to later drop. The commands within the command buffers 540A-540D are organized in an execution order in the command queue 550 for execution on the GPU 560. The memory controller in the GPU 560 accesses the command group and state information stored in the command queue 550.

As described earlier, the GPU 560 uses the memory cache 570 as a temporal buffer to store temporal data during the processing of the command group. Although the memory cache 570 is shown external to the GPU 560, in other embodiments, the memory cache 570 is located within the GPU 560. In various embodiments, the memory cache 570 is the last-level cache before accesses are sent to lower-level memory such as DRAM. In other embodiments, the memory cache 570 is one or more levels away from being the last-level cache before accesses are sent to the lower-level memory. For example, in embodiments where the last-level cache is a level three (L3) cache in a hierarchical cache memory subsystem, the memory cache 570 is the L3 cache. In other embodiments, the memory cache 570 is a L2 cache accessed prior to accessing the L3 cache.

The cache controller 572 controls accesses to the cache array 574 within the memory cache 570. In various embodiments, the cache array 574 uses a separate tag array and a data array. In other embodiments, tags and other state and metadata are stored in the same array with the corresponding data. As described earlier, the cache controller 572 in the memory cache 570 maps the V-DSIDs for temporal data sets to P-DSIDs. When allocating the temporal data sets, in some embodiments, the cache controller 572 stores a non-replaceable attribute in corresponding cache lines in the cache array 574 to prevent a cache replacement policy from evicting the temporal cache line before it is dropped. In other embodiments, the V-DSIDs stored in the cache lines of the cache array 574 are used to indicate the non-replaceable persistence attribute without actually storing this attribute in the cache lines.

In various embodiments, the drop command arrives at the cache controller 572 in the memory cache 570 from the software application 510 through the GPU driver 530, one of the commands buffers 540A-540D, the command queue 550, and the GPU 560. When the cache controller 572 receives the drop command, the cache controller 572 removes cache lines corresponding to the data sets with the V-DSIDs designated in the drop command. The cache controller 572 looks up the mapping for the designated V-DSIDs to find the corresponding P-DSIDs and searches cache lines storing these P-DSIDs. The cache controller 572 removes the cache lines by invalidating them and without writing the cache lines back to lower-level memory. The P-DSIDs are freed for reuse when the cache line removal completes.

The targeted cache lines are invalidated by the cache controller 572 and the targeted cache lines are not written back to lower-level memory regardless of other state information such as a dirty or clean state. In some embodiments, cache controllers corresponding to caches within the GPU 560 perform the same steps as the cache controller 572 for the memory cache 570. Thus, one or more of the caches within the GPU 560 also execute the drop command and remove cache lines with the V-DSID designated by the drop command by invalidating these cache lines and not writing them back to a next lower-level memory regardless of other state information such as a dirty or clean state.

As described earlier, when processing the drop command, the cache controller 572 walks through the cache array 574 from line to line and compares the P-DSID stored I the cache line to a list of one or more P-DSIDs mapped from the one or more V-DSIDs designated by the drop command. In some embodiments, this walking operation occurs in the background so as not to impact performance of the memory cache 570. In an embodiment, the walking operations occurs when the tag pipeline has idle slots. In one embodiment, a configuration register programmable by firmware or other software stores a minimum rate at which the walker operation is injected into the tag pipeline. For example, when a rate of 10 is stored in the configuration register, a minimum of one walker operation is put into the tag pipeline for every 10 other operations servicing requests.

In some embodiments, the cache controller 572 supports a de-prioritize operation allowing software (e.g., software application 510, GPU driver 530) to transfer each cache line with a particular V-DSID to a default V-DSID. In some embodiments, the default V-DSID is out of the range of V-DSIDs used for temporal data sets to drop. Other state information, such as a non-replaceable attribute, is updated based on the default V-DSID. For example, in an embodiment, cache lines with the default V-DSID are updated to not using a replaceable attribute. Consequently, the count of cache lines contributing to the quota of the original V-DSID is reduced by the number of cache lines updated.

In one embodiment, when the V-DSID of a write request is unable to be mapped to a P-DSID as there are no available P-DSIDs, the cache controller 572 uses the default V-DSID. As a consequence, the cache line with temporal data will not be dropped later, but no data corruption occurs. Rather system performance is not increased due to the lack of dropping the temporal data after consumption. Similarly, when the quota of a received V-DSID is met, the cache controller 572 uses the default V-DSID for handling requests.

In an embodiment, when a particular access request cause a cache line fill operation to take place, the cache controller 572 overrides the cache replacement policy, such as a LRU cache replacement algorithm, and replaces cache lines with a V-DSID corresponding to a drop command which is still executing. A DSID mapping table is used to identify mappings corresponding to a drop command in progress as described earlier in FIG. 3. The evicted cache line, in this case, is invalidated, but not written back to lower-level memory. In addition, the count of cache lines with the V-DSID corresponding to the drop command in progress is reduced.

In an embodiment, when an access request is received by the cache controller 572 which designates a V-DSID equal to a V-DSID of a drop command in progress, the cache controller updates the V-DSID of the access request to the default V-DSID. For fill cache lines being allocated into the cache array 574 due to a cache miss, the cache controller 572 uses the V-DSID of the received access request for the allocated cache line. In an embodiment, when a read request hits on a cache line in the cache array 574 and the DSID of the read request is different than the DSID of the hit cache line, the cache controller 572 maintains the DSID of the hit cache line.

In an embodiment, when a write request for updating a full cache line hits on a cache line in the cache array 574 and the DSID of the write request is different than the DSID of the hit cache line, the cache controller 572 updates the DSID of the hit cache line to the DSID of the write request. When a write request for partially updating a cache line hits on a cache line in the cache array 574 and the DSID of the write request is different than the DSID of the hit cache line, the cache controller 572 updates the DSID of the hit cache line to the default DSID. When a non-allocate write request hits on a cache line in the cache array 574 and the DSID of the write request is different than the DSID of the hit cache line, the cache controller 572 updates the DSID of the hit cache line to the default DSID. For each of the cases, the cache controller 572 updates corresponding quota counters.

Figure 6:
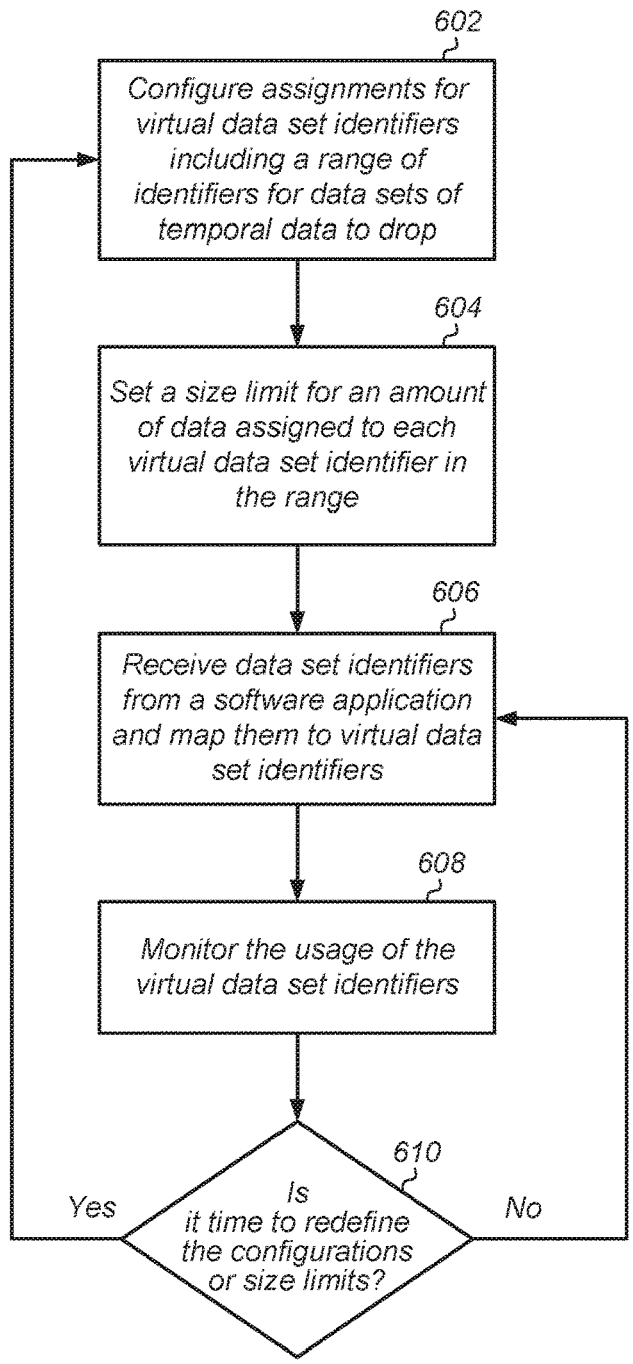
FIG. 6 is a flow diagram of one embodiment of a method for configuring data set identifiers for data to be processed.

Referring now to FIG. 6, a generalized flow diagram of one embodiment of a method 600 for configuring data set identifiers for data to be processed is shown. For purposes of discussion, the steps in this embodiment (as well as for FIGS. 7 and 8) are shown in sequential order. However, in other embodiments some steps may occur in a different order than shown, some steps may be performed concurrently, some steps may be combined with other steps, and some steps may be absent.

Assignments for virtual data set identifiers are configured including a range of identifiers for data sets of temporal data to drop (block 602). For example, programmable configuration registers and tables are set based on the chosen configuration. In various embodiments, a cache controller in a memory cache uses the chosen configuration when handling access requests to a corresponding cache array as previously described. One example of a configuration setting is setting a size limit (quota) for an amount of data assigned to each virtual data set identifier in the range (block 604).

Instructions of a software application are processed and during processing, data set identifiers are sent from a software application to the cache controller of the memory cache. The data set identifiers are mapped during the transmission to virtual data set identifiers (block 606). In various embodiments, a kernel mode driver maps the data set identifiers to virtual data set identifiers (V-DSIDs). The cache controller monitors the usage of the V-DSIDs (block 608). For example, the cache controller maintains a count of the number of cache lines using particular V-DSIDs. In some embodiments, the cache controller updates a DSID mapping table as described earlier.

If it not yet time to redefine the configurations for the identifiers or the size limits ("no" leg of the conditional block 610), then control flow of method 600 returns to block 606 where data set identifiers are received by the cache controller of the memory cache and the data set identifiers are mapped. Otherwise, if it is time to redefine the configurations for the identifiers or the size limits ("yes" leg of the conditional block 610), then control flow of method 600 returns to block 602 for the reconfigurations.

Figure 7:
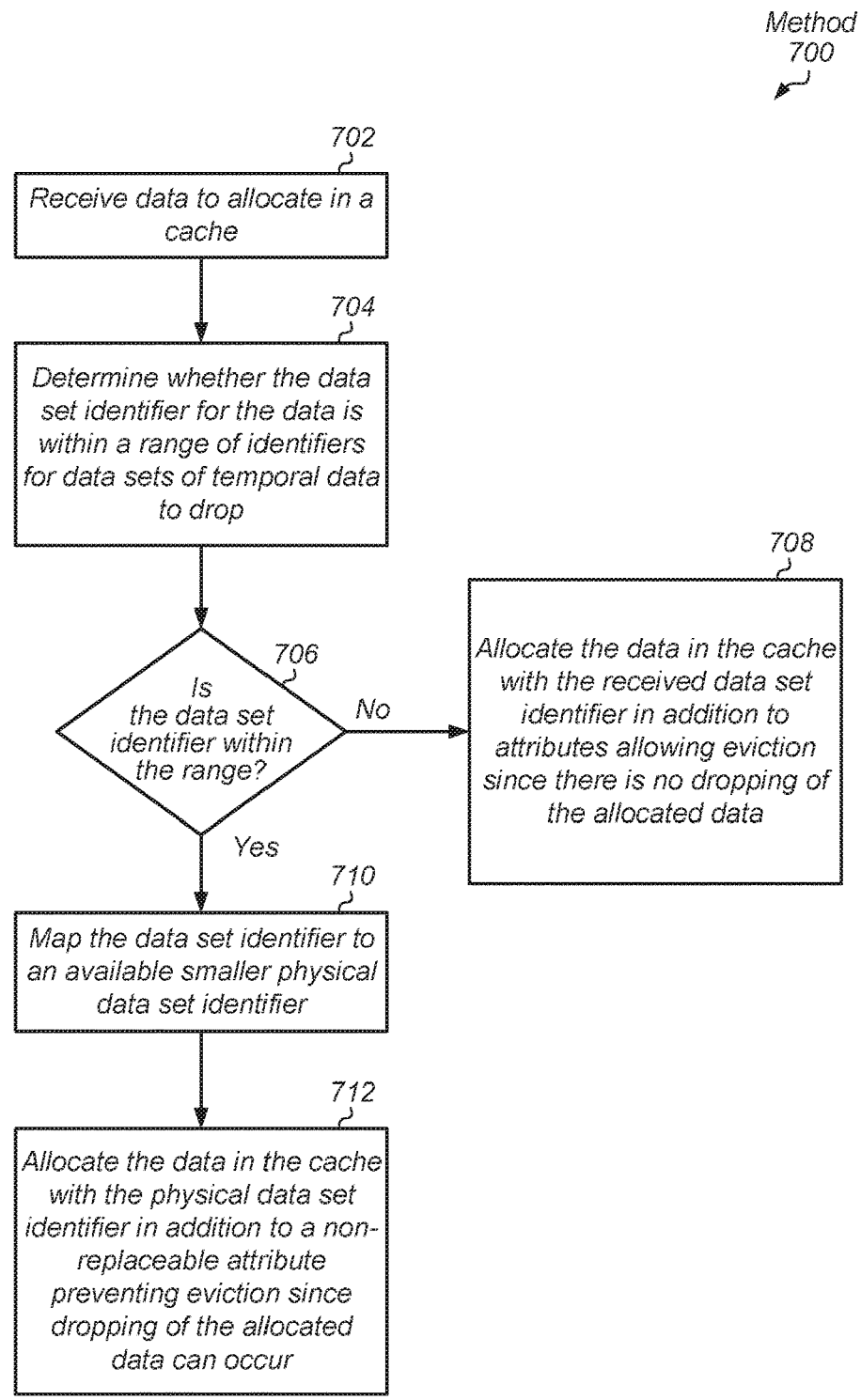
FIG. 7 is a flow diagram of one embodiment of a method for allocating data in a cache based on data set.

Turning now to FIG. 7, a generalized flow diagram of one embodiment of a method 700 for allocating data in a cache based on data set.is shown. Data is received for allocation in a cache (block 702). It is determined whether the data set identifier for the data is within a range of identifiers for data sets of temporal data to drop (block 704). If the data set identifier is not within the range ("no" leg of the conditional block 706), then the data is allocated in the cache with the received data set identifier in addition to attributes allowing eviction by a cache replacement policy since there is no dropping of the allocated data (block 708).

If the data set identifier is within the range ("yes" leg of the conditional block 706), then the data set identifier is mapped to an available smaller physical data set identifier (block 710). The data is allocated in the cache with the physical data set identifier in addition to a non-replaceable attribute preventing eviction by a cache replaceable policy since dropping of the allocated data can occur (block 712). As described earlier, it is possible for multiple corner cases to occur. Referring again to FIG. 5, the steps taken for these corner cases were described earlier regarding the cache controller 572 in the memory cache 570.

Figure 8:
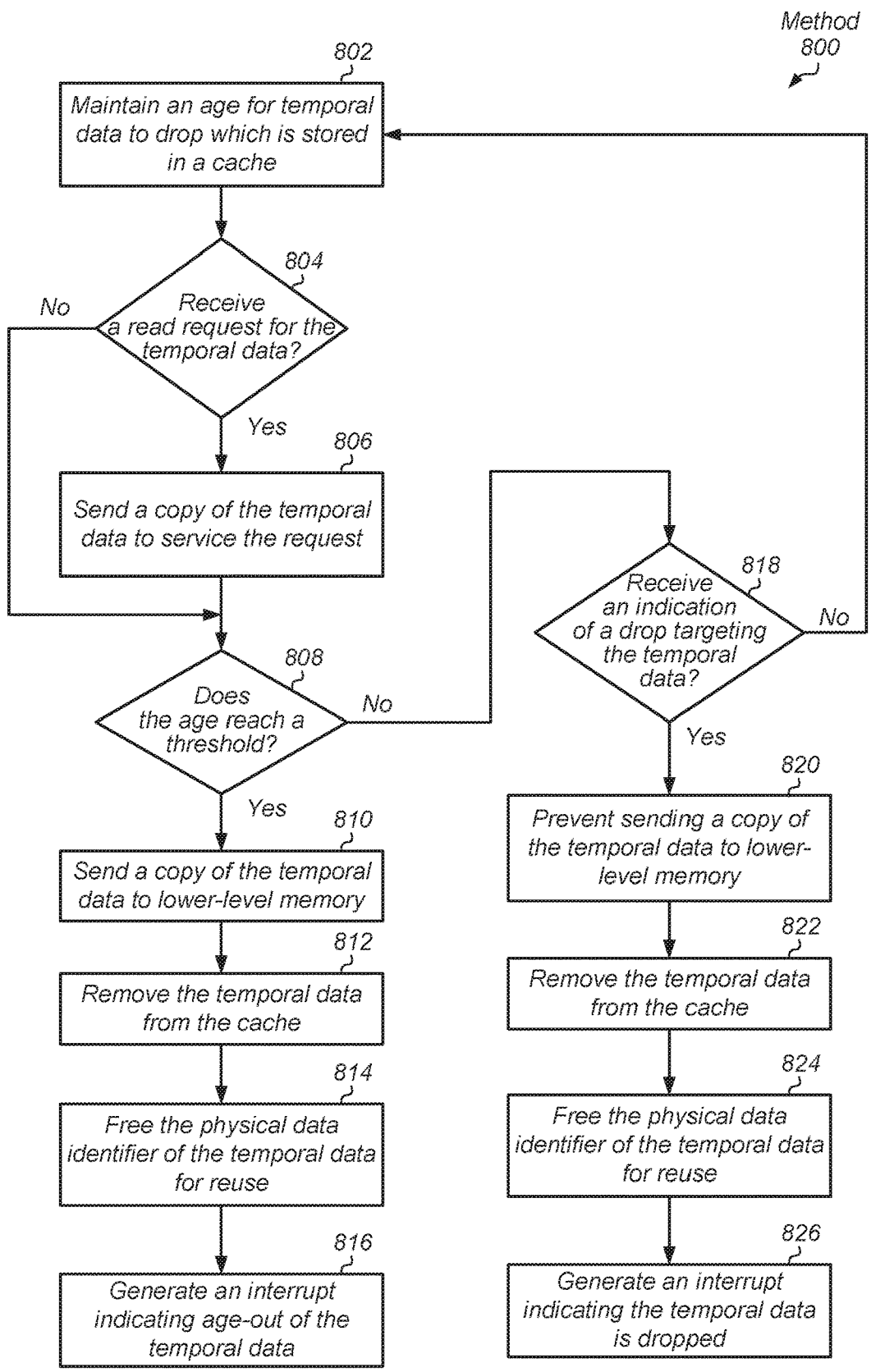
FIG. 8 is a flow diagram of one embodiment of a method for processing a drop for data being consumed for the last time.

Referring to FIG. 8, a generalized flow diagram of one embodiment of a method 800 for processing a drop is shown. An age is maintained for temporal data to drop (block 802). If a read request is received by the cache controller of the memory cache for the temporal data ("yes" leg of the conditional block 804), then a copy of the temporal data is sent for servicing the request (block 806). If a read request is not received for the temporal data ("no" leg of the conditional block 804), then the data continues to be stored in the cache while metadata is updated. One example of the metadata is an age of storage in the cache for the data.

If the age reaches a threshold ("yes" leg of the conditional block 808), then a copy of the temporal data is sent to lower-level memory (block 810). Additionally, the temporal data is removed from the cache (block 812). The physical data identifier of the temporal data is freed for reuse (block 814). In one embodiment, an interrupt is generated which indicates an age-out of the temporal data has occurred (block 816). In another embodiment, a particular configuration register is updated to indicate an age-out of the temporal data has occurred.

If the age has not yet reached a threshold ("no" leg of the conditional block 808), and an indication of a drop targeting the temporal data as data that should be dropped is not received ("no" leg of the conditional block 818), then control flow of method 800 returns to block 802 where an age is continued to be maintained for temporal data to drop. In some embodiments, the indication of a drop is a drop command or a hint included in an access request. However, if the age has not yet reaches a threshold ("no" leg of the conditional block 808), and an indication of a drop targeting the temporal data has been received ("yes" leg of the conditional block 818), then sending a copy of the temporal data to lower-level memory is prevented (block 820). The temporal data is removed from the cache (block 822). The physical data set identifier of the temporal data is freed for reuse (block 824) in a mapping table storing mappings between virtual data set identifiers and physical data set identifiers as previously described. In an embodiment, an interrupt indicating the temporal data is dropped is generated (block 826). In another embodiment, a particular configuration register is updated indicating the temporal data is dropped.

Figure 9:
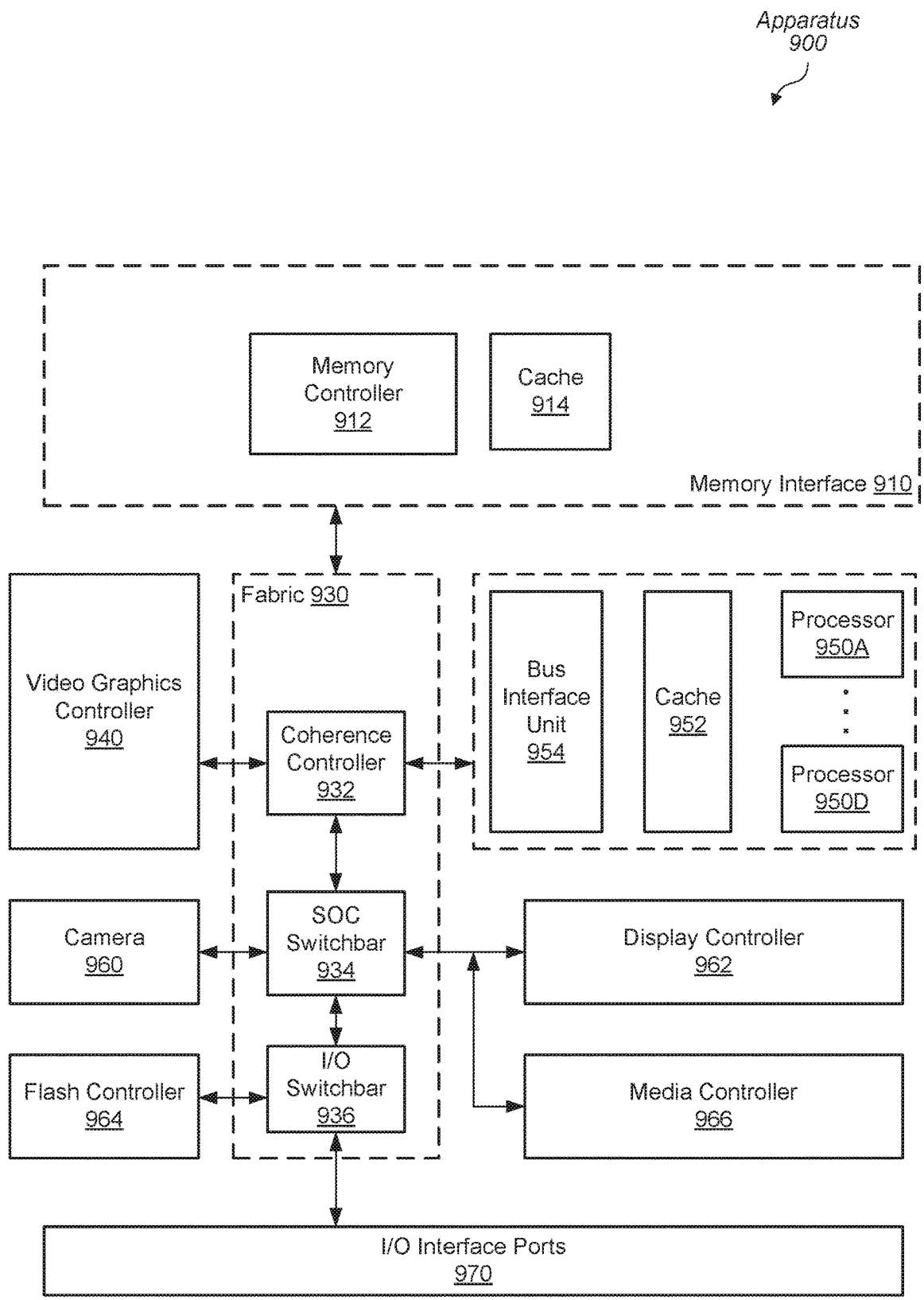
FIG. 9 is a block diagram of one embodiment of an apparatus.

Referring to FIG. 9, a generalized block diagram illustrating one embodiment of an apparatus 900 is shown. The apparatus 900 includes multiple functional blocks or units. In some embodiments, the multiple functional units are individual dies on an integrated circuit (IC), such as a system-on-a-chip (SoC). In other embodiments, the multiple functional units are individual dies within a package, such as a multi-chip module (MCM). In yet other embodiments, the multiple functional units are individual dies or chips on a printed circuit board. The multiple functional blocks or units may each be capable of accessing a shared memory.

In various embodiments, the apparatus 900 is a SOC that includes multiple types of IC designs on a single semiconductor die, wherein each IC design provides a separate functionality. The IC designs on the apparatus 900 may also be referred to as functional blocks on the apparatus 900. Traditionally, each one of the types of IC designs, or functional blocks, has been manufactured on a separate silicon wafer. In the illustrated embodiment, the apparatus 900 includes multiple IC designs; a fabric 930 for high-level interconnects and chip communication, a memory interface 910, and various input/output (I/O) interfaces 970. Clock sources, such as phase lock loops (PLLs), and a centralized control block for at least power management are not shown for ease of illustration.

The multiple IC designs within the apparatus 900 include various analog, digital, mixed-signal and radio-frequency (RF) blocks. In the illustrated embodiment, the apparatus 900 includes one or more processors 950A-950D with a supporting cache hierarchy that includes at least cache 952. In some embodiments, the cache 952 is a shared level two (L2) cache for the processors 950A-950D. In addition, the multiple IC designs include a display controller 962, a flash memory controller 964, and a media controller 966.

Further, the multiple IC designs may include a video graphics controller 940 and one or more processing blocks associated with real-time memory performance for display and camera subsystems, such as camera 960. The camera 960 uses an image blender capability and other camera image processing capabilities as is well known in the art. In some embodiments, the apparatus 900 groups processing blocks associated with non-real-time memory performance, such as the media controller 966, for image scaling, rotating, and color space conversion, accelerated video decoding for encoded movies, audio processing and so forth. The units 960 and 966 use analog and digital encoders, decoders, and other signal processing blocks. In other embodiments, the apparatus 900 uses other types of processing blocks in addition to or in place of the blocks shown.

The I/O interface ports 270 may include interfaces well known in the art for one or more of a general-purpose I/O (GPIO), a universal serial bus (USB), a universal asynchronous receiver/transmitter (uART), a FireWire interface, an Ethernet interface, an analog-to-digital converter (ADC), a DAC, and so forth.

In various embodiments, the fabric 930 provides a top-level interconnect for the apparatus 900. For example, connections to the cache coherence controller 932 exist for various requestors within the apparatus 900. A requestor is one of the multiple IC designs on the apparatus 900. The cache coherence controller 932 provides to the multiple IC designs a consistent data value for a given data block in the shared memory, such as off-chip dynamic random access memory (DRAM). The coherence controller 932 may use a cache coherency protocol for memory accesses to and from the memory interface 910 and one or more caches in the multiple IC designs on the apparatus 900. An example of a cache coherency protocol includes the MOESI protocol with the Modified (M), Owned (O), Exclusive (E), Shared (S), and Invalid (I) states.

In some embodiments, one requestor connection to the coherence controller 932 may be provided for one or more graphics processing units (GPUs) within the video graphics controller 940, one requestor connection for the processor cores 950A-950D, and one request connection for the remainder of the multiple IC designs and the I/O interface ports 970 on the apparatus 900. The SOC switch bar 934 is used to aggregate traffic from these remaining multiple IC designs.

In various embodiments, different types of traffic flow independently through the fabric 930. The independent flow is accomplished by allowing a single physical fabric bus to include a number of overlaying virtual channels, or dedicated source and destination buffers, each carrying a different type of traffic. Each channel is independently flow controlled with no dependence between transactions in different channels. In various embodiments, the fabric 930 supports traffic carrying V-DSIDs and hints such as hints for drop commands.

The memory interface 910 uses the memory controller 912 and the cache 914. The cache 914 is used to reduce the demands on memory bandwidth and average power consumption. As shown, in some embodiments, the memory controller 912 is not a coherency point within the apparatus 900 as it is separate from the coherence controller 932. This separation allows the cache 914 to be inserted in the path to off-chip memory. The memory cache 914 is logically located between the coherence controller 932 and the memory controller 912. Additionally, in some embodiments, the cache 914 does not participate in a cache coherency protocol. In other embodiments, the memory interface 910 uses a directory-based coherency protocol causing the coherency point to be located within the memory interface 910. In such embodiments, the cache 914 participates in the cache coherency protocol.

The cache 914 is used by each one of the multiple IC designs on the apparatus 900. In an embodiment, the allocation policy for the cache 914 is programmable. The interface between the combination of the memory interface 910 and the coherency controller 932 and the remainder of the apparatus 900, which includes the multiple IC designs and the switch bars 934 and 936, includes multiple buses. Asynchronous memory requests, responses, snoops, snoop responses, and input/output (I/O) transactions are visible at this interface with temporal relationships.

The display controller 962 sends graphics output information that was rendered to one or more display devices. The rendering of the information is performed by the display controller 962, by the video graphics controller 940, or by one of the processors 950A-950D which is a GPU. Alternatively, the display controller 969 may send graphics output information to the video graphics controller 940 to be output to one or more display devices. The graphics output information corresponds to frame buffers accessed via a memory mapping to the memory space of a GPU within the video graphics controller 940 or within one of the processors 950A-950D. The memory mappings are stored and updated in address translators. Video data read from the frame buffers stored in the off-die DRAM or the on-die cache 914 includes at least color values for each pixel on the screen.

Each one of the processors 950A-950D uses one or more cores and one or more levels of a cache memory subsystem. Each core supports the out-of-order execution of one or more threads of a software process and include a multi-stage pipeline. One or more of the processors 950A-950D uses circuitry for executing instructions according to a predefined general-purpose instruction set. For example, the PowerPC® instruction set architecture (ISA) may be selected. Alternatively, the ARM®, x86®, x86-64®, Alpha®, MIPS®, PA-RISC®, SPARC® or any other instruction set architecture is selected.

Other processor cores of processors 950A-950D have a micro-architecture which provides high instruction throughput for a computational intensive task such as a single instruction multiple data (SIMD) core. Examples of SIMD cores include graphics processing units (GPUs), digital signal processing (DSP) cores, or other. One or more of the processors 950A-950D uses multiple on-die levels (L1, L2, L3 and so forth) of caches for accessing data and instructions. If a requested block is not found in the on-die caches or in the off-die cache 952, then a read request for the missing block is generated and transmitted to the memory interface 910 or to on-die flash memory (not shown) controlled by the flash controller 964. The bus interface unit (BIU) 954 provides memory access requests and responses for at least the processors 950A-950D.

The processors 950A-950D share the on-chip flash memory and the off-chip DRAM accessed through the memory interface 910 with other processing blocks, such as graphics processing units (GPUs), application specific integrated circuits (ASICs), and other types of processor cores. Therefore, typical SOC designs utilize acceleration engines, or accelerators, to efficiently coordinate memory accesses and support coherency transactions between processing blocks and peripherals. In a SOC design that includes multiple processors and processing blocks, these components communicate with each other to control access to shared resources.

In various embodiments, the cache controller of one or more of the on-die caches for the processors 950A-950D, the cache 952, and the cache 914 uses a DSID mapping table and temporal data set drop control logic as described earlier. For the cache 914, examples of sources for generating temporal data sets for later dropping is one or more of a GPU within the processors 950A-950D, a GPU within the video graphics controller 940, the camera 960, the display controller 962 and the media controller 966. The fabric 930 supports the transfer of commands and hints for indicating the temporal data sets for dropping.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A cache controller comprising:
    a first interface coupled to a cache comprising a plurality of entries; and
    a control unit configured to:
        maintain a table different from the cache comprising a plurality of entries, wherein one or more entries of the table is configured to store a data set identifier that identifies a data set which is to be dropped after being consumed;
        maintain a plurality of age counters for the plurality of entries of the table that are marked as non-replaceable; and
        based at least in part on a determination that a given age counter of the plurality of age counters corresponding to a given data set identifier has reached a threshold, remove any indications of a non-replaceable attribute of entries of the cache corresponding to the given age counter.

2. The cache controller as recited in claim 1, wherein in further response to determining the given age counter has reached the threshold, the control unit is further configured to free the given data set identifier for reuse.

3. The cache controller as recited in claim 1, wherein in further response to determining the given age counter has reached the threshold, the control unit is further configured to remove, from the cache, data stored in the entries of the cache corresponding to the given age counter.

4. The cache controller as recited in claim 1, wherein the cache controller further comprises a second interface coupled to a lower-level memory, and wherein in further response to determining the given age counter has reached the threshold, the control unit is further configured to send, to the lower-level memory via the second interface, a copy of data stored in the entries of the cache corresponding to the given age counter.

5. The cache controller as recited in claim 1, wherein in further response to determining the given age counter has reached the threshold, the control unit is further configured to update a status register to indicate an age-out has occurred for data stored in the entries of the cache corresponding to the given age counter.

6. The cache controller as recited in claim 1, wherein in further response to determining the given age counter has reached the threshold, the control unit is further configured to generate an interrupt to indicate an age-out has occurred for data stored in the entries of the cache corresponding to the given age counter.

7. The cache controller as recited in claim 6, wherein the interrupt indicating that the age-out has occurred notifies one or more of: firmware, a software application, and a device driver.

8. The cache controller as recited in claim 1, wherein the cache controller further comprises a third interface configured to receive commands, and the control unit is further configured to remove, for the entries of the cache with the given data set identifier, any indication of the non-replaceable attribute, in response to:
    determining the given age counter has not reached the threshold; and
    receiving, via the third interface, an indication of transferring entries of the cache with the given data set identifier to a new data set identifier that is not associated with non-replaceable data.

9. A method comprising:
    storing, by logic of a cache controller, data in a plurality of entries of a cache;
    maintaining, by the logic, a table different from the cache comprising a plurality of entries, wherein one or more entries of the table is configured to store a data set identifier that identifies a data set which is to be dropped after being consumed;
    maintaining, by the logic, a plurality of age counters for the plurality of entries of the table that are marked as non-replaceable; and
    in response to determining a given age counter of the plurality of age counters corresponding to a given data set identifier has reached a threshold, removing, by the logic, any indications of a non-replaceable attribute of entries of the cache corresponding to the given age counter.

10. The method as recited in claim 9, wherein in further response to determining the given age counter reaches the threshold, the method further comprises freeing the given data set identifier for reuse.

11. The method as recited in claim 9, wherein in further response to determining the given age counter has reached the threshold, the method further comprises removing, from the cache, data stored in the entries of the cache corresponding to the given age counter.

12. The method as recited in claim 9, wherein in further response to determining the given age counter has reached the threshold, the method further comprises sending, to a lower-level memory, a copy of data stored in the entries of the cache corresponding to the given age counter.

13. The method as recited in claim 9, wherein in further response to determining the given age counter has reached the threshold, the method further comprises generating an interrupt to indicate an age-out has occurred for data stored in the entries of the cache corresponding to the given age counter.

14. The method as recited in claim 13, wherein the interrupt indicating that the age-out has occurred notifies one or more of: firmware, a software application and a device driver.

15. The method as recited in claim 9, further comprising removing, for the entries of the cache with the given data set identifier, any indication of the non-replaceable attribute, in response to:
  determining the given age counter has not reached the threshold; and
  receiving an indication of transferring entries of the cache with the given data set identifier to a new data set identifier that is not associated with non-replaceable data.

16. A computing system comprising:
  a cache array comprising a plurality of entries for storing data; and
  a cache controller configured to:
    maintain a table different from the cache comprising a plurality of entries, wherein one or more entries of the table is configured to store a data set identifier that identifies a data set which is to be dropped after being consumed;
    maintain a plurality of age counters for the plurality of entries of the table that are marked as non-replaceable; and
    based at least in part on a determination that a given age counter of the plurality of age counters corresponding to a given data set identifier reaches a threshold, remove any indications of a non-replaceable attribute of entries of the cache corresponding to the given age counter.

17. The computing system as recited in claim 16, wherein in further response to determining the given age counter has reached the threshold, the cache controller is further configured to free the given data set identifier for reuse.

18. The computing system as recited in claim 16, wherein in further response to determining the given age counter has reached the threshold, the cache controller is further configured to remove, from the cache, data stored in the entries of the cache corresponding to the given age counter.

19. The computing system as recited in claim 16, wherein in further response to determining the given age counter has reached the threshold, the cache controller is further configured to send, to a lower-level memory, a copy of data stored in the entries of the cache corresponding to the given age counter.

20. The computing system as recited in claim 16, wherein in further response to determining the given age counter has reached the threshold, the cache controller is further configured to generate an interrupt to indicate an age-out has occurred for data stored in the entries of the cache corresponding to the given age counter.

* * * * *